March 20, 1962     O. M. NOREHAD     3,026,060
RADIALLY ADJUSTABLE REEL
Original Filed April 13, 1954     4 Sheets-Sheet 1

INVENTOR.
Onnig M. Norehad,
BY Parker & Carter
Attorneys.

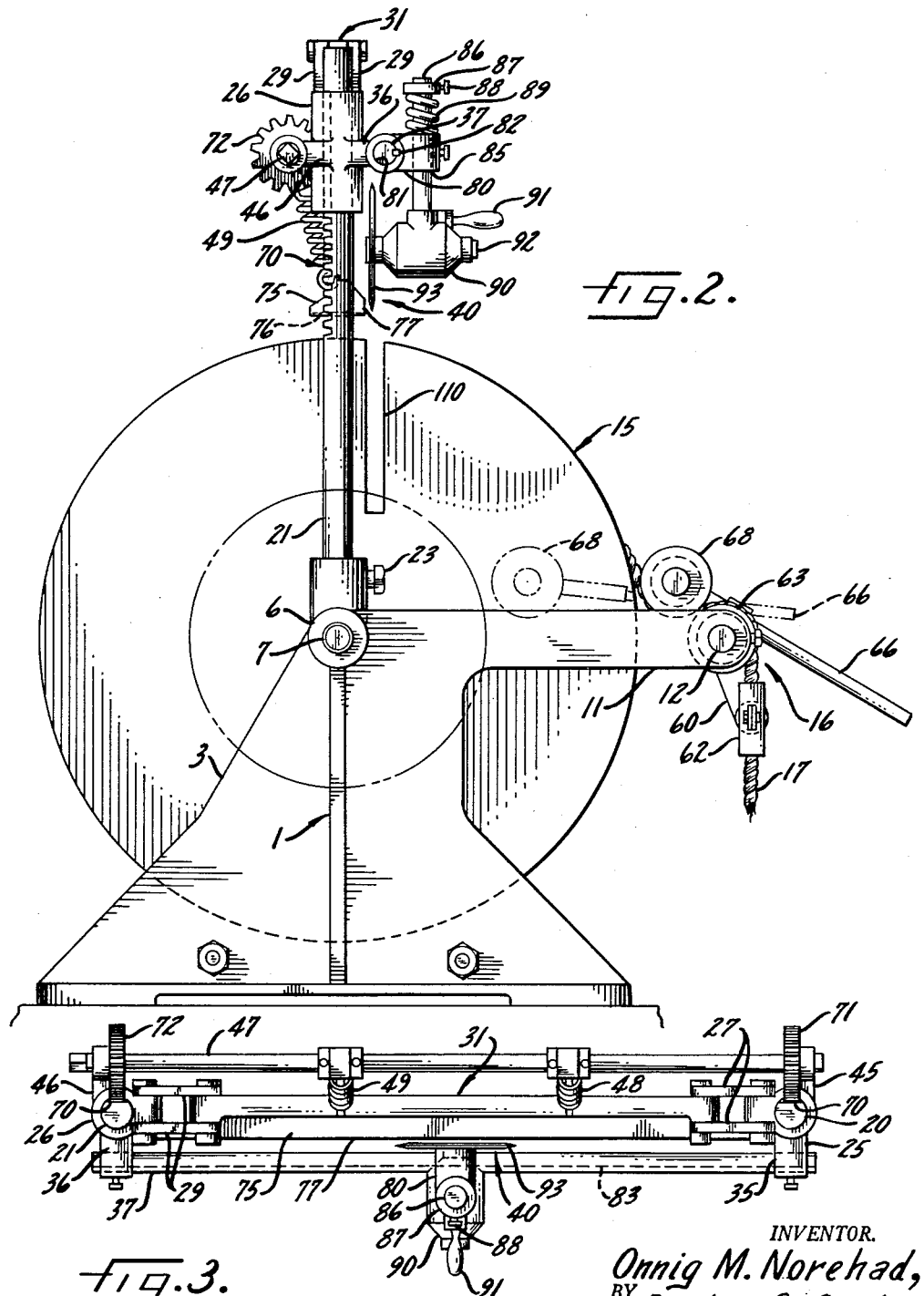

March 20, 1962 O. M. NOREHAD 3,026,060
RADIALLY ADJUSTABLE REEL
Original Filed April 13, 1954 4 Sheets-Sheet 3
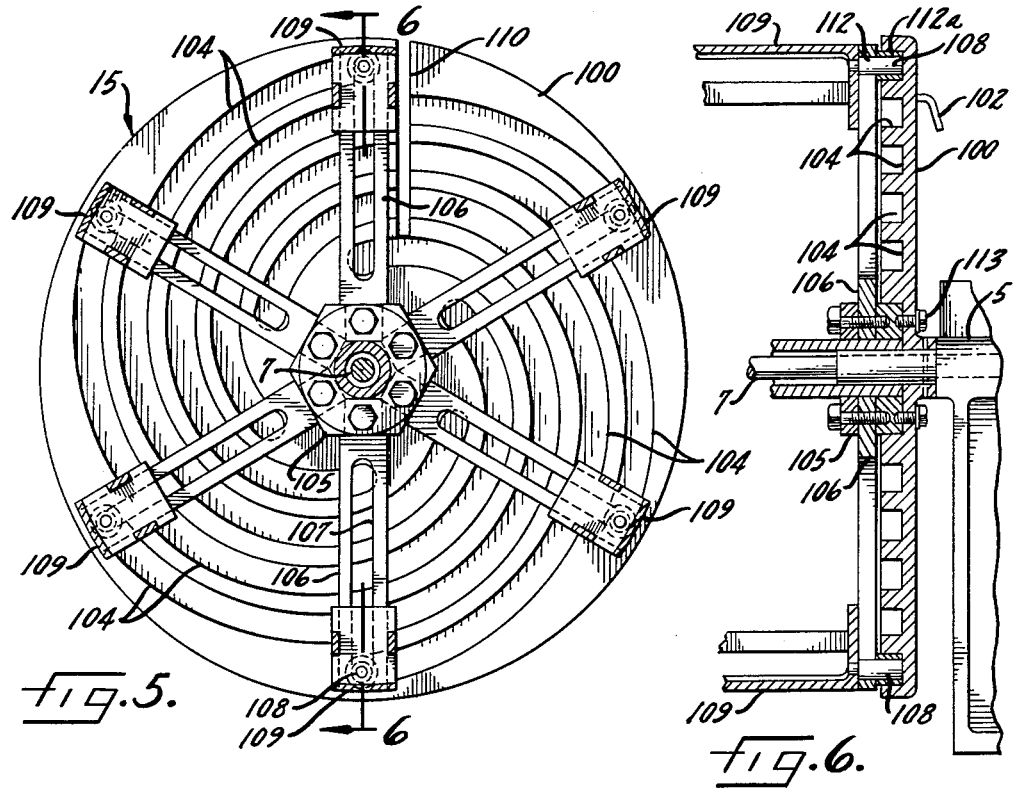
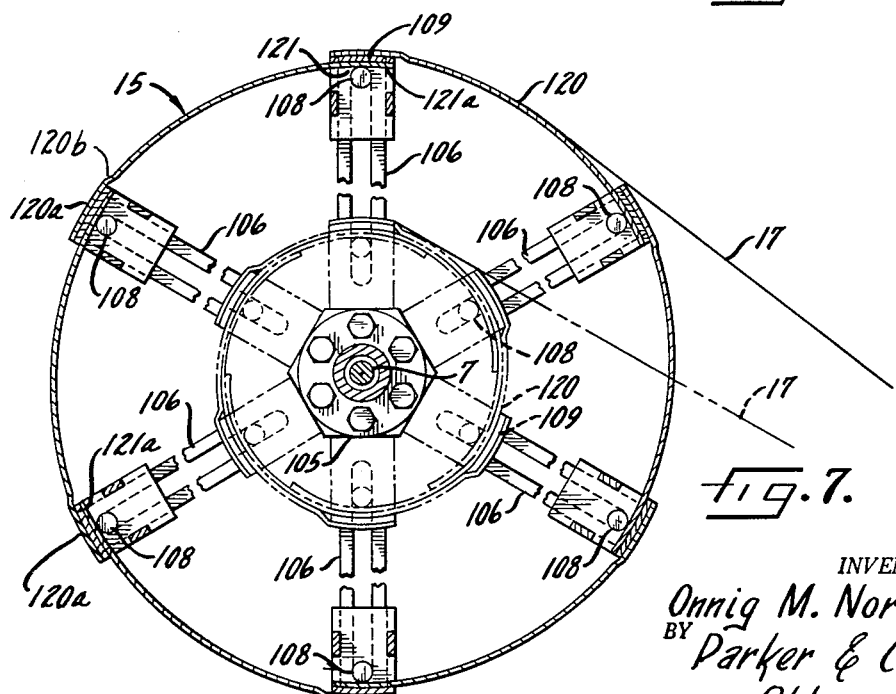
INVENTOR.
Onnig M. Norehad,
BY Parker & Carter
Attorneys.

March 20, 1962  O. M. NOREHAD  3,026,060
RADIALLY ADJUSTABLE REEL
Original Filed April 13, 1954  4 Sheets-Sheet 4
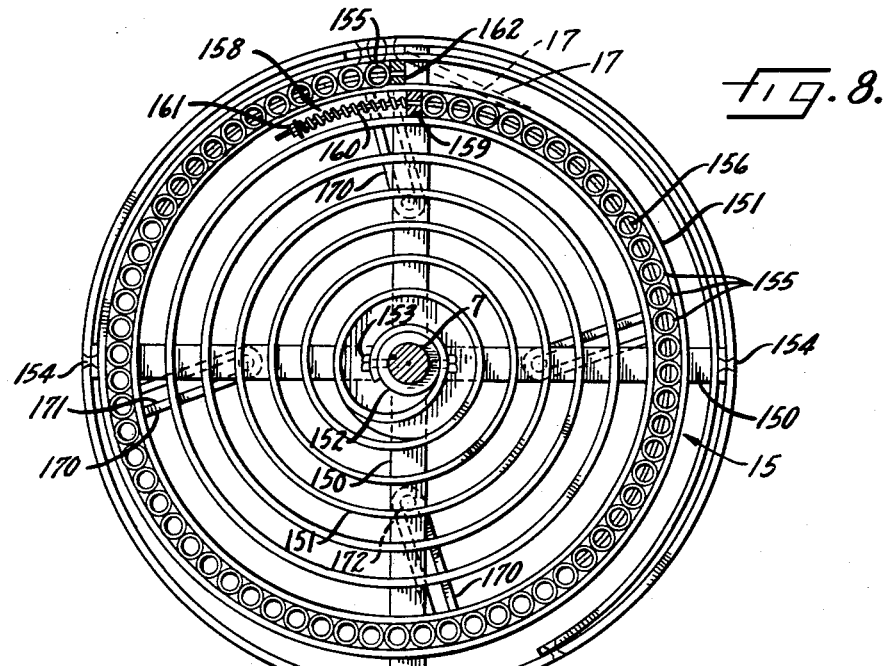
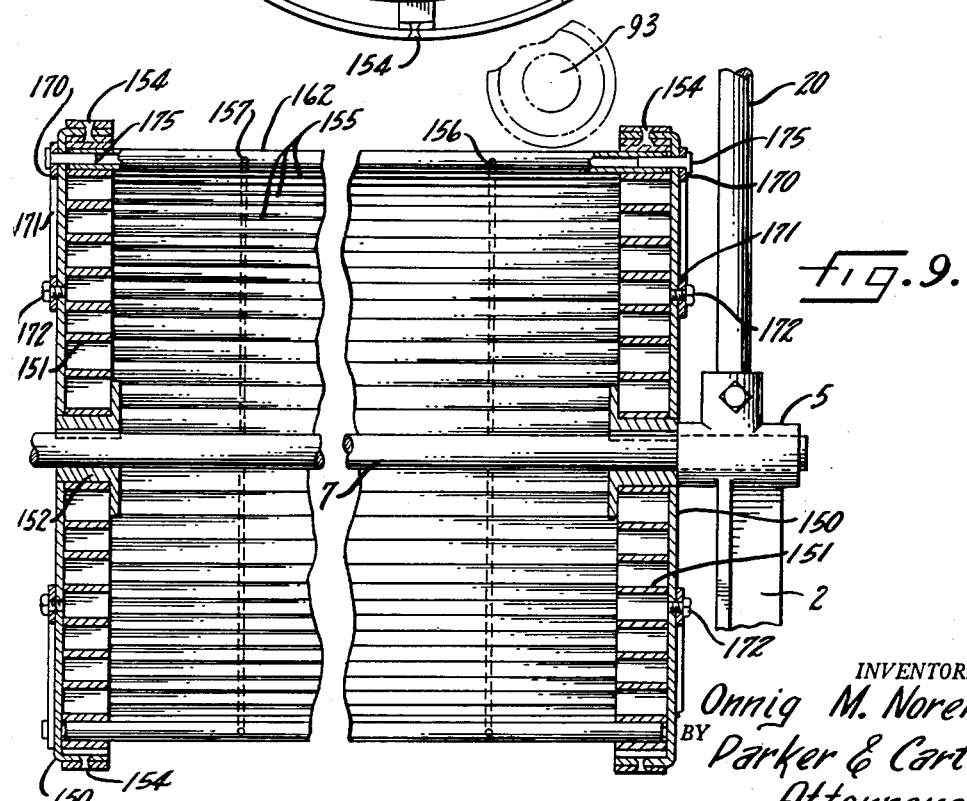
INVENTOR.
Onnig M. Norehad,
BY Parker & Carter
Attorneys.

United States Patent Office 3,026,060
Patented Mar. 20, 1962

3,026,060
RADIALLY ADJUSTABLE REEL
Onnig M. Norehad, Chicago, Ill.
(321 Ashland Ave., Evanston, Ill.)
Original application Apr. 13, 1954, Ser. No. 422,776, now Patent No. 2,819,760, dated Jan. 14, 1958. Divided and this application May 29, 1957, Ser. No. 662,509
6 Claims. (Cl. 242—110.1)

This invention relates to machines useable in cutting a length of cord into a plurality of segments equal in length and has particular relation to a machine for cutting such cords which may be operated by one person.

This application is a division of applicant's co-pending application, Serial No. 422,776 filed April 13, 1954, now Patent No. 2,819,760.

One purpose of the invention is to provide a machine for cutting a cord into lengths which are certain to be substantially equal in length.

Another purpose is to provide a cutting machine for cord which is effective automatically to insure equality in length between the segments into which the cord is cut.

Another purpose is to provide a machine having a rotary member onto which a cord may be fed under desired tension.

Another purpose is to provide a cutting machine for cord which shall be effective to cut the cord cleanly into a plurality of equal-length segments without causing the segments to be disturbed adjacent the point of cutting.

Another purpose is to provide a machine useable in cutting a cord into equal-length segments, the length of the segments being adjustable.

Another purpose is to provide a cutting machine for cord, including adjustable means for varying the length of the segments into which the cord is cut.

Other purposes will appear from time to time in the course of the specification and claims.

Figure 1:
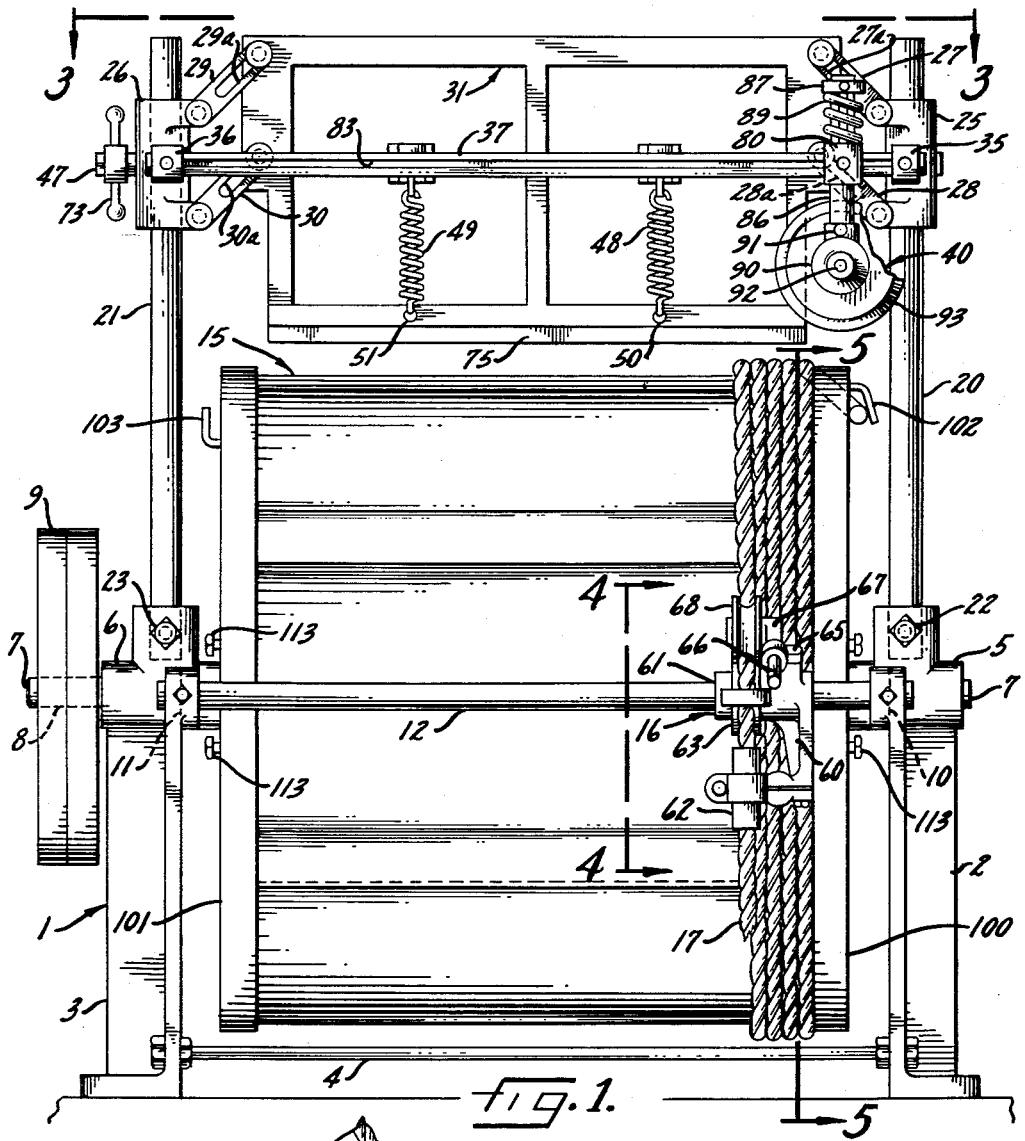
Figure 4:
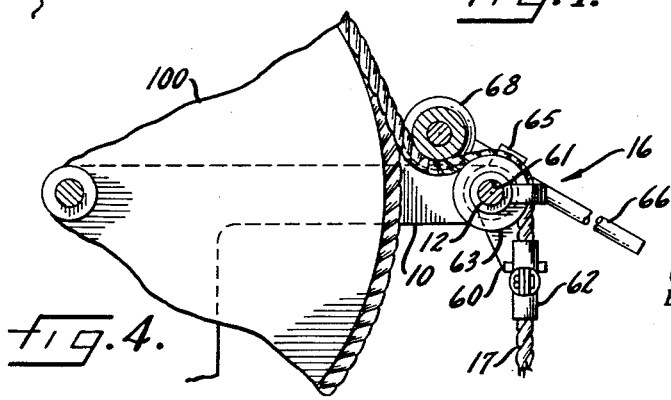

The invention is illustrated more or less diagrammatically in the accompanying drawings, wherein:

FIGURE 1 is a side elevation;
FIGURE 2 is an end elevation;
FIGURE 3 is a view taken on the line 3—3 of FIGURE 1;
FIGURE 4 is a view taken on the line 4—4 of FIGURE 1;
FIGURE 5 is a view in partial cross-section, taken on the line 5—5 of FIGURE 1;
FIGURE 6 is a detail side view in partial cross-section, taken on the line 6—6 of FIGURE 5;
FIGURE 7 is a view similar to FIGURE 5 and illustrating the parts in a plurality of positions;
FIGURE 8 is an end view of a variant form of a cord-receiving means employed in the invention;
FIGURE 9 is a side view in partial cross-section of the structure illustrated in FIGURE 8.

Like parts are indicated by like numerals throughout the specification and drawings.

Referring now to the drawings, and particularly to FIGURE 1, the numeral 1 generally indicates a frame or support which may include a pair of up-rights or pedestals 2, 3 which may be joined adjacent their bases by a cross arm or rod 4. The pedestals 2, 3 have adjacent their upper ends the respective bosses or bearings 5, 6 in which is journaled a cross shaft 7. The shaft 7 may have secured to its end portion 8, which extends outwardly from the journal 6, a pulley means, generally shown at 9. Any suitable power means may be suitably associated with the pulley 9 for rotating the shaft 7. Since the particular power means does not form any part of the present invention, it is not shown and will not be further described.

As best seen in FIGURE 2, the pedestals 2, 3 may have, respectively, the laterally-extending parallel arm members 10, 11 to which is secured a cross arm or fixed shaft 12.

The shaft 7 has secured thereon, between the pedestals 2, 3 and for rotation with the shaft 7, a drum, generally indicated by the numeral 15. Mounted for slidable movement along the fixed shaft 12 is a cord-feeding and tensioning means, generally indicated by the numeral 16. As best seen in FIGURE 1, the means 16 is arranged for movement along the shaft 12 in general alignment with the drum 15. A cord is illustrated generally at 17.

A pair of upstanding members 20, 21 are secured at their lower ends, respectively, to the pedestals 2, 3 as at 22, 23. Mounted for vertical movement along the upper portions of the standards 20, 21 in a pair of bracket members 25, 26. The bracket 25 has a pair of links 27, 28 secured to an inwardly-extending portion thereof and the bracket 26 has a pair of links 29, 30 secured to an inner portion of the bracket 26. The links 27—30 are secured at their inwardly-extending ends to a frame member, generally shown at 31. The brackets 25, 26, have, respectively, laterally-extending arms 35, 36 which extend in the same direction and in parallel paths and which are joined by a cross arm 37. Mounted for slidable movement along the cross arm 37, in general alignment with the frame 31 above the drum 15, is a cutting means, shown generally at 40. The brackets 25, 26 have extending from their rear faces a pair of parallel arms 45, 46, as best seen in FIGURE 3. Mounted for rotation in the bearings in the arms 45, 46 is a cross shaft 47. A pair of spring members 48, 49 extend from the cross shaft 47 downwardly to a lower portion of the frame 31 to which they are connected, as indicated generally at 50, 51.

The cord-feeding and tensioning means includes a body member 60 having a transverse bore 61 through which extends the fixed shaft 12. Secured to an arm on the body member 60 is a cord-guiding sleeve 62 through which the cord 17 may extend. A roller 63 is rotatably mounted on the body member 60 and may be generally coaxial with the bore 61 and shaft 12. As best seen in FIGURE 1, the guide 62 and roller 63 are in general alignment one with the other.

The body member 60 has along an upper portion thereof a clamp 65 in which may be clamped an arm 66 extending generally transversely of the shaft 12. The arm 66 has a bent end portion 67 on which may be rotatably journaled the roller 68 in general alignment with the roller 63 and cord guide 62. As best seen in FIGURE 1, the rollers 63, 68 have a pair of annular flanges, the roller surface between the flanges being concave to receive and aid in guiding and being guided by the cord 17. As best seen in FIGURE 2, the arm 66 permits the roller 68 to occupy a variety of positions in relation to the drum 15.

As best seen in FIGURE 2, the upper rear faces of the stanchions 20, 21 may be cut to form a rack such as that shown generally at 70 in FIGURE 2. A pair of gears 71, 72 may be mounted for rotation with the shaft 47 and for engagement with the rack 70 on the stanchions 20, 21. Since the shaft 47 is secured to the brackets 25, 26, it is apparent that rotation of the shaft 47 and consequent rotation of the gears 71, 72 will cause movement of the brackets 25, 26 in a vertical direction along the rack 70 and therefor along the stanchions 20, 21. A manually-operable handle means for rotation of the shaft 47 is shown generally at 73 in FIGURE 1.

As best seen also in FIGURE 2, the frame 31 has an enlarged lower cross member 75, which may have its lower face 76 generally concave to conform to the outer surface of the drum 15 and thus to the configuration of the cord 17 wound on the drum or cylinder 15.

As best seen in FIGURE 1, the link members 27—30 each are slotted, as shown at 27a—30a, the slots surrounding the attaching means to the frame 31.

The cutting means 40, as best seen in FIGURE 2, includes a fitting 80 having a bore 81 through which extends the shaft 37. A key 82 may be employed to retain the fitting 80 in desired laterally-extending position on the shaft 81 while permitting movement of the fitting 80 along the shaft. A longitudinal groove 83 for the key 82 may be seen best in FIGURE 1.

A vertical bore 85 in the fitting 80 may have extending therethrough a vertical shaft or arm 86. An abutment member 87 may be secured as by the bolt 88 to an upper portion of the shaft 86 and a spring 89 may surround the shaft 86 between the abutment member 87 and an upper surface of the fitting 80. The shaft 86 has secured to its lower end, below the fitting 80, a motor means 90 and a manually-grippable handle means 91. The motor means 90 has extending therefrom a rotatable shaft 92 on which is secured a rotatable knife member 93 which may be in the form of a disc. As best seen in FIGURE 2, a side surface 77 on the lower frame cross-arm 75 may serve as a guide for the knife 93.

In FIGURES 5-7, I illustrate one means for adjusting the circumference of the drum or reel 15. The drum 15 may be composed of a pair of side discs or frame members 100—101. Indicated at 102, 103 are clip means into which ends of the cord 17 may be inserted prior to the cutting operation. The inner face of the disc 100 may have a plurality of parallel curved grooves, indicated generally at 104. Each of the grooves 104 has one end adjacent the outer periphery of the disc 100. From thence, each of the grooves 104 curves inwardly in a generally spiral-like path, terminating at its inner end at a point adjacent the axis of the disc 100. Each of the grooves 104 has its terminal inner end in radial alignment with the outer beginning of another of the grooves 104. There may be six grooves 104. A fitting 105 may be secured to the shaft 7 and may have extending therefrom and in fixed relationship with the fitting 105 the radial arms 106, which may be six in number. Each of the arms 106 has a longitudinal slot 107 extending through the major lineal portion thereof. Mounted for slidable movement within the slot 107 is, in each of the arms 106, a pin member 108 to which is secured a cross-arm member 109. It will be realized that the disc 101 corresponds to the disc 100, illustrated in FIGURE 5, and that the cross arms 109 extend between the discs, as shown partially in FIGURE 6. A slot 110 is cut in the disc 100, generally parallel to one of the radial arms 106, and a similar slot is cut in the disc 101 in alignment with the slot 110 to permit the passage therethrough of a portion of the knife blade 93 during the cutting operation. It will be understood that the pin 108 extends, as best seen in FIGURE 6 and as shown at 112, outwardly beyond the arm 106. This extension carries a roller 112a which rides within one of the grooves 104. A lock means is shown generally at 113 in FIGURE 6 as being secured to the outer face of the disc 100. The lock 113 has a portion extendable into the groove 104 and effective to prevent movement of the pin 108 within the grooves 104, and therefore to hold the cross arms 109 in the desired position in relation to the grooves 104 and thus in relation to the radial arms 106.

In FIGURE 7, the cross arms 109 are illustrated in their outermost position and also in their innermost position. In addition, each of the cross arms 109 is fitted with a bridging or plate member 120. The bridging member 120 has one of its longitudinal edges 120a secured along the outer face of a cross arm 109 and its opposite longitudinal edge fitted loosely in a groove 121 below the outer face of the cross arm 109, as shown generally at 121a. As best seen in FIGURE 7, the bridging members 120 are caused to overlap within the grooves or openings 121 in the cross arm 109 as the cross arms draw closer to the center, the last position of overlap being indicated in FIGURE 7, when the cross arm 109 has reached their innermost positions. It will be understood that the bridging members extend from the disc 100 to the disc 101 and thus form a continuous outer wall for the drum or reel 15. The members 120 are downwardly or inwardly offset along the cross members 109, as indicated at 120b, to provide a ridge over which the cord 17 is forced to pass, thus creating a space beneath the cord 17 so that the knife 93 can cut the cord without contacting the members 120. It will be understood that members 120 are flexible to a certain extent to permit them to bend as the diameter of the reel is decreased when the cross arms draw closer to the center.

In FIGURES 8 and 9, I illustrate a variant form of my reel adjusting means. In place of the discs 100, 101, illustrated in the prior figures, there may be employed a set of crossed radial arms, generally shown at 150. A spiral track 151 may be secured to the frame formed by the cross arms 150 which are themselves secured for rotation with the shaft 7. The spiral track 151 may be secured at its inner end to a fitting 152 which is in turn secured to the shaft 7. 153 illustrates securing means for the inner end of the track 151. The track 151 may be secured to the outer ends of the cross arm 150 as shown generally at 154.

A drum-forming means may be composed of a plurality of tubes or pipes 155 which are of sufficient extension to permit their opposite ends to ride in each of the two tracks 151 which are spaced along the shaft 7 in the manner of the discs 100, 101.

The pipes or tubes 155 may be secured together by a cable means, illustrated generally at 156, 157. While two such cable means are illustrated, it will be understood that the number of cables 156, 157 may be varied without departing from the nature and scope of my invention. The cables have a portion extending beyond the inner pipe 155, as shown generally at 158. An abutment member 159 may have an inner concave face held against an outer portion of the end pipe 155 by a spring 160 surrounding the extending end portion of the cable and held thereon by an abutment 161 secured to the end of the cable. A similar abutment means 162 may be held against the outer face of the opposite end pipe 155. The cable extends into the abutment 162 and is held within a groove therein by any suitable means. A locking means, serving to position the pipes 155, is shown generally at 170. The locking means 170 may have a generally longitudinal slot 171. A securing means 172 extends through the slot 171 and connects with one of the radial arms 150. The opposite end of the means 170 may carry an inwardly extending pin 175 of sufficient length to pass inwardly beyond the frame arms 150 and into the open end of one of the pipes 155, thus serving to position the drum wall formed by the pipes 155. As illustrated in FIGURE 8, each of the arms 150 may be provided with a locking means 170, if desired. Since the means 170 is slotted and may be pivoted about the securing means 172, the pin 175 may be inserted into one of the pipes 155 at a variety of points along the track 151.

Whereas I have described and illustrated a practical and operative device, nevertheless, many changes may be made in the size, shape, number and disposition of parts without departing from the spirit of my invention. I, therefore, wish my description and drawings to be taken as in a broad sense illustrative or diagrammatic, rather than as limiting me to my precise showing.

The use and operation of my device are as follows:

I provide a device which, while simple, is effective to permit the cutting of a cord into a plurality of individual segments and for insuring equality of length among such segments automatically. The device may be operated by one man.

A cord, such as the cord 17, which may be rope, wire, or other material, is first passed through the guide means 16 and the lead end thereof is then placed on the cylindrical side wall of the reel 15, with the loose end clipped to the member 15 by a holding means, such as the means 102. A power means (not shown) is then started up and the shaft 7 and drum means 15 are rotated. As the drum is rotated, the cord 17 is fed thereon in a more or less spiral pattern, as indicated partially in FIGURE 1. Since the rollers 63, 68 are flanged, as indicated in FIGURE 1, feeding of the cord 17 onto the drum 15 in side-by-side relationship, as shown in FIGURE 1, causes the means 16 to move along the shaft 12 in response to the winding of the cord 17 on the drum 15. As the parts are shown in the drawings, the means 16 is caused to move from right to left as the cord 17 is fed on the drum 15.

When the cord 17 has been wound along the entire length of the circumferential wall of the reel 15, the motor means may be stopped and the cord, if desired, may be held within the clip means 103 on the drum disc 101. The operator then grasps the handle 91 on the cutting means 40 and exerts a downward pull thereon against the action of the spring 89 to place the knife disc 93 in generally horizontal alignment with an upper portion of the cord wound on the drum 15. The operator may have started rotation of the knife disc 93 prior to exerting a downward pull on the handle 91. In any event, when the knife disc 93 is rotating, the operator then exerts a sideward pressure, from right to left, as the parts are shown in the drawings, sliding the cutting means 40 along the shaft 37 to cut the cord. Since the reel or drum 15 is cylindrical in form and since it has parallel sides, it is clear that the cord will thus be cut into a plurality of equal length segments. Since the cord was wound onto the drum 15 under a certain amount of tension, the amount of tension being adjustable by the setting of the roller 68 through positioning of the arm 66 and clamp 65, the cord will snap outwardly and downwardly when cut so as to lie beneath the drum means 15 and on top of the clamping bar 4. The operator need only then gather up the segments lying beneath the drum 15.

It will be realized that the frame 31 was caused to move downwardly when the operator continued to exert sufficient downward pressure on the handle 91. This downward pressure, having overcome the spring 89, exerts a downward pressure on the bracket 25, 26 sufficient to cause a slight rotation of the shaft 47 and gears 71, 72. Since the frame 31 has its lower cross arm 75 close to the top layer of the cord 17, only a very small amount of downward pressure is necessary to cause the member 75 to be brought into contact with the cord 17. The member 75 is thus effective to hold the cord 17 against any possible tendency to move in response to the cutting pressure of the knife 93 and the front face 77 of the member 75 is effective to serve as a guide for the knife 93 in its travel through the cord 17. It will be realized that the use of a rotating knife blade 93 and the holding means 75 results in a neat cut of the cord 17 with little or no fraying of the strands thereof.

It will be understood that the guide 62 and clamp 65 may be adjustably mounted on the body member 60 to facilitate the setting of desired tension on the cord 17.

While the cord 17 is shown as being fed onto the reel 15 from right to left, it will be realized that it could be fed alternately from right to left and left to right on the reel 15.

In order to vary the length of the segments into which the cord 17 may be cut, I provide means for adjusting the circumference of the reel 15 which in turn determines the length of the segments into which the cord 17 is cut. In cooperation with means for adjusting the circumference of the drum or reel 15, the rack 70 and pinion gears 71, 72 along with the rotatable shaft 47 and handle means 73 are provided to permit vertical adjustment of the frame 31 and cutting means 40.

In order to adjust the size of the drum when constructed in accordance with the disclosure of FIGURES 5–7, it is necessary only to twist the discs 100, 101 while holding the radial arms 106 stationary. The illustration of FIGURE 5 shows the reel-forming cross arms 109 in their outermost position. When it is desired to reduce the length of the segments into which the cord 17 may be cut, it is necessary only to hold the radial arm 106 stationary while turning the discs 100, 101 in a clockwise direction, as the parts are shown in FIGURES 5–7. This movement of the discs causes the pins 108 to move counterclockwise in relation to the grooves 104. As the pins 108 thus move in the grooves 104, they are caused to move inwardly toward the axis of the discs 100, 101. In so doing, the pins 108 travel inwardly in the slots 107. When the cross arms 109, which move with the pins 108, have reached the desired position on the arms 106, the locking means 113 may be inserted to lock the discs or drum-ends 100, 101 to the cross-arm member and thus to retain the cross arms in this desired position. While the structure of FIGURE 5 may be satisfactorily employed in the cutting of certain types of cord, the spacing or bridging members 120, illustrated in FIGURE 7, may be employed in the cutting of other types of cord which may require backing in the spaces between the cross arms 109. It will be understood that the operation of the devices illustrated in FIGURES 5 and 7 is identical, the wall-forming or bridging or backing members 120 merely telescoping or overlapping as the cross arms 109 are moved inwardly toward the axis of the drum as the side discs are rotated to cause the pins 108 to move inwardly toward the axis of the drum.

In adjusting the reel illustrated in FIGURES 8 and 9, it is necessary only to pull the pins 175 outwardly from engagement with the ends of the pipes 155. It will be understood that each locking means support 170 may be pivoted on a member 150 and formed of a type of spring metal or leaf spring which will permit the pin 175 to be pulled outwardly manually. Thereafter it is necessary only to grasp the longitudinal abutment member 162 and exert pressure thereagainst. The pressure thus exerted will cause the drum-forming or wall-forming means or members comprising the plurality of pipes 155 secured together by the cables 156, 157 to move within the spiral track 151. As the pipes 155 move in the track 151 the circumference formed by the pipes 155 is diminished, as will be seen best from a view of FIGURE 8. As shown in dotted lines in FIGURE 8, the cord 17, when wound onto the reel 15, is forced to rise from one portion of the circumference formed by the pipes 155 up over the abutment 162 thus forming a space, below the cord 17 and along the length of the reel in front of the abutment 162, through which the knife blade 93 may pass.

The spring 89 can be of sufficient strength to prevent downward movement of the cutting means 40 until after the frame 31 has moved downwardly a distance sufficient to cause the cord-holding bar 75 to contact the cord 17. Continued downward pressure exerted on the handle 91 is thereafter effective to cause the knife 93 to move downward to cut the cord 17. As illustrated in FIGURES 1 and 2, for example, the spring 89 may be of substantially greater thickness and strength than the springs 48—49 and also of a strength sufficient to overcome any resistance of the rack and pinion means 70, 71, 72. If desired, a trip switch may be associated with the fitting 80 and vertical arm 86 to automatically start rotation of the knife motor 90 upon downward movement thereof.

I claim:

1. In a reel device having a shaft and a pair of opposed end members, the combination therewith of means for adjusting the diameter of said reel including a spiral track secured to the inner face of each of said end members, a flexible circumferential wall-forming member including a plurality of tubular members secured together in parallel relationship by a cable passing through the side walls thereof, said tubular members having their opposite open ends positioned for movement along said tracks, means for locking said wall-forming member in a variety of positions on said tracks including a leaf-spring member secured at one end to the outer face of one of said end members and having a pin secured to its opposite end of sufficient length to extend into the open end of one of said tubular members when said leaf-spring is in its normal position.

2. The structure of claim 1 wherein said leaf-spring is pivotally secured to said end member.

3. In a reel device having a shaft and a pair of opposed end members, the combination therewith of means for adjusting the diameter of said reel including a spiral track secured to the inner face of each of said end members, a flexible circumferential wall-forming member having its opposite ends mounted for movement along said tracks and means for locking said last-named member in a variety of positions on said tracks, said locking means including a plurality of support members pivotally and movably secured to the outer face of one of said end members, each of said support members having a pin at its opposite end extensible into the path of said track to engage said wall-forming member, said support members being of sufficient extension to permit the entry of one of said pins at any desired position along said track.

4. A variable diameter cord receiving reel comprising a shaft, end members fixed to opposite ends of said shaft for rotation therewith, a spiral track secured to the inner face of each of said end members, flexible circumferential wall forming means having opposite ends mounted for movement along said tracks to thereby adjust the diameter of said reel, said flexible circumferential wall forming means including a plurality of tubular members secured together in parallel relationship by a cable passing through the side walls thereof, said tubular members having their opposite open ends positioned in said tracks and pin means associated with each of said end members and extending therethrough, said pin means adapted to enter opposite ends of predetermined tubular members to lock said wall forming means against movement along said track so as to fix said diameter at a predetermined adjustment.

5. The reel of claim 4 further characterized in that said pin means includes pin carrying elements pivotally mounted on said end members so as to permit a wide choice of adjustment on said diameter.

6. A variable diameter cord receiving reel comprising a shaft, end members fixed to opposite ends of said shaft for rotation therewith, a spiral track secured to the inner face of each of said end members, circumferential wall forming means having opposite ends mounted for movement along said track to thereby adjust the diameter of said reel and pin means associated with each of said end members and extending therethrough, said pin means being adapted to lock opposite ends of said wall forming means against movement so as to fix said diameter at a predetermined adjustment, said wall forming means including a plurality of tubular members and means securing said tubular members together in parallel relationship, said pin means locking said tubular members against movement along said tracks.

References Cited in the file of this patent

UNITED STATES PATENTS

| | | |
|---|---|---|
| 45,366 | Vrydagh | Dec. 6, 1864 |
| 533,312 | McCombs | Jan. 29, 1895 |
| 860,859 | Driscoll et al. | July 23, 1907 |
| 2,229,796 | Carlson | Jan. 28, 1941 |
| 2,300,869 | Brandes | Nov. 3, 1942 |
| 2,326,092 | Borton | Aug. 3, 1943 |